United States Patent [19]
Arjunan

[11] Patent Number: 5,486,326
[45] Date of Patent: Jan. 23, 1996

US005486326A

[54] PROCESS FOR CONVERTING POLYKETONES TO POLYESTERS

[75] Inventor: Palanisamy Arjunan, Houston, Tex.

[73] Assignee: Exxon Chemical Patents Inc., Linden, N.J.

[21] Appl. No.: 443,137

[22] Filed: May 17, 1995

Related U.S. Application Data

[62] Division of Ser. No. 220,774, Apr. 11, 1994, Pat. No. 5,466,780.

[51] Int. Cl.$^6$ ................................................. B29C 47/00
[52] U.S. Cl. .................. 264/176.1; 525/471; 524/755; 524/765; 524/773; 522/24; 522/134; 428/357

[58] Field of Search ................ 525/471; 524/755, 524/765, 773; 522/24, 134; 264/176.1; 428/357

[56] References Cited

U.S. PATENT DOCUMENTS

| | | | |
|---|---|---|---|
| 4,929,711 | 5/1990 | Chang et al. | 528/220 |
| 4,957,997 | 9/1990 | Chang et al. | 528/220 |
| 5,180,797 | 1/1993 | Austin et al. | 525/539 |
| 5,281,681 | 1/1994 | Austin | 526/266 |

*Primary Examiner*—Samuel A. Acquah
*Attorney, Agent, or Firm*—M. S. Spiering

[57] ABSTRACT

A polyketone is contacted with an organic peroxyacid in a reactive, oxidization, slurry process to produce a polyester polymer.

3 Claims, No Drawings

PROCESS FOR CONVERTING POLYKETONES TO POLYESTERS

This is a divisional of application Ser. No. 08/220,774, filed Apr. 11, 1994, now U.S. Pat. No. 5,466,780.

FIELD OF THE INVENTION

This invention relates to a process for converting polyketone polymers to polyester polymers. More particularly, the process involves oxidative conversion of keto groups to ester groups.

BACKGROUND OF THE INVENTION

Biodegradable polymers are of significant interest due to current environmental to concerns. Degradation or break down of the polymer typically occurs by a chemical reaction leading to bond scission in the backbone of a polymer. Degradation ultimately results in reduction in molecular weight. Degradation can occur by chemical, biological, environmental, and/or physical forces. Biodegradable polymers are polymers in which a living organism, such as bacterium, fungus, or enzymes. metabolize or break down the polymer. Known biodegradable polymers include, for example, water-soluble polymers having polyvinylalcohol as base material and polymers containing ester groups in the backbone. Moisture-resistant polymers, such as, hydroxybutyrate/valerate are produced from natural feedstocks and are also biodegradable. Generally, commercial grade, high molecular weight polyethylenes (PE) are not biodegradable, but low molecular weight (Mw) oligomers (Mw <500) are.

Polyketones, i.e., polymers having carbonyl groups incorporated in the polymer chain, are most commonly produced by polymerizing carbon monoxide with one or more α-olefins. Peroxidation of the polyketone is one of the methods to prepare selected polyesters, i.e., polymers having oxycarbonyl groups incorporated in the polymer chain. Polyesters are commonly produced by converting keto groups to ester groups. Polyethylene copolymers, such as ethylene/carbon monoxide copolymers ($C_2^=/CO$), can be converted to polyester copolymers via a Baeyer-Villiger oxidation (ionic, acid-catalyzed) reaction using selected peracids such as peroxyacetic acid (PAA), m-chloroperoxybenzoic acid (MCPBA), trifluoroperoxyacetic acid, peroxymaleic acid, and the like. Such oxidation of $C_2^=/CO$ copolymer was disclosed by Chang et al., U.S. Pat. Nos. 4,929,711 and 4,957,997 and by Austin et al. U.S. Pat. No. 5,180,797. For a general background discussion of conversion of polyketones to polyesters and processes for producing thermoplastic polymer from polyketones, see U.S. Pat. Nos. '797, '711, and '997, each herein incorporated by reference.

U.S. Pat. Nos. '711 and '997 to Chang et al. describe batch (as opposed to continuous) reaction processes for converting polyketones to polyesters by reacting a polyketone with an organic peroxyacid oxidizing agent in an inert liquid medium. The ester conversions in these processes typically require over an hour to achieve desirable results. These processes are not practical from a commercial standpoint, because they cannot be readily adapted for mass production of polyesters. Because conversion occurs in a solution phase, the polyester polymer of interest must be precipitated with copious quantities of organic solvents such as methanol. Extended reaction time often results in side reactions such as chain scission or hydrolysis of the ester group and, ultimately, degradation of the molecular weight of the polymer. Generally, the molecular weight of the final polyester product made by the process of U.S. Pat. Nos. '711 or '997 is not high enough to fabricate articles, fibers or films.

U.S. Pat. No. '797 to Austin et al., describes conversion of polyketones to polyesters employing a solid or molten reaction phase. Austin et al., specifically disclose a batch process for making a polyester by contacting a solid or molten polyketone with an organic peroxyacid at a temperature from about 20° C. to about 110° C., The process disclosed in U.S. Pat. No. '797 requires the use of solid peracids that are expensive, and the removal of excess reagent, such as excess acid, to purify the polyester polymer desired. Concerns with this procedure include costs and safety, because of the limited choice of solid peracids and the explosive nature of the reagents. Like the process disclosed by Chang et al., the molecular weight of the resulting polyester is typically too low to form products therefrom.

Despite the variety of techniques known for the conversion of keto groups to ester groups, the art lacks a process that allows carbonyl groups incorporated into the polymer chain of a polyketone to be readily oxidized to ester groups in a relatively safe, economical, and commercial scale process which also allows control of molecular weight of the final product. It is desirable to have a commercially feasible. optionally continuous process for the peroxidation of polyketones to polyesters.

SUMMARY OF THE INVENTION

It is an object of the invention to provide a process for converting polyketones to polyesters (1) without substantially altering the molecular weight of polymer produced; (2) involving a simple and economic work-up procedures to isolate the final product, (3) using peracids that can be generated "in-situ", and conveniently recharged or recycled, (4) involving an environmentally compatible and safe scale-up procedure, (5) involving safe, non-explosive peroxidation reagents.

In the preferred embodiment, these and other objects of this invention are provided by a Baeyer-Villiger process in which a polyketone polymer is treated as a slurry with at least one organic peracid or metallic peracid in a liquid carrier. The acid can be in the solid or liquid form. The reactants are kept as a slurry using the liquid carrier. The reaction mixture is heterogeneous or in a multi-phase reaction. Reaction temperatures are generally maintained from about ambient to higher temperatures (from about 25° to about 100° C.) over a period of at least about 5 minutes or more. The process is preferably performed at a temperature sufficient to dissolve the peroxidizing agent, generally from about 60° C. to about 100° C. and for a time sufficient to convert at least 5 mole % or greater of the carbonyl groups to ester groups. Conversion of the ketone to the ester group can generally be controlled in the slurry process through manipulation of the reaction temperature, reaction time, reaction pH, and particle size of the substrate, i.e., the polyketone. The liquid carder is generally a polar solvent such as water or the like. The slurry process is generally run at a pH between about 1 to about 7.

The peroxidizing agent employed is generally an organic peroxyacid represented by the following general formula:

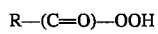

wherein R is a $C_{1-19}$ aliphatic, $C_{5-19}$ cyloaliphatic, or $C_{6-19}$ aromatic radical unsubstituted or substituted with one or more halo, nitro, or carboxyl groups. Representative peracids include persulfuric, perbenzoic, m-chloroperoxybenzoic acid, perphthalic, peracetic, and trifluoroperacetic acids or derivatives thereof. It is preferred to have electron withdrawing groups on the peroxidizing acid to enhance the peroxidating performance of the acid. The molar ratio of peroxidizing agent to carbonyl in the polyketone is from about 0.1:1 to about 5:1.

DETAILED DESCRIPTION OF THE PREFERRED EMBODIMENTS

The term polyketone generally refers to polymers having a plurality of carbonyl groups (i.e., C=O) in the polymer chain. The carbonyl groups, sometimes also referred to as ketone or keto groups, may be randomly or uniformly distributed throughout the polymer chain. For purposes of this invention, the term polyketone refers to any polymer containing a plurality of carbonyl groups, even if the carbonyl group is not the predominant functional group.

The term polyester encompasses polymer having one or more oxycarbonyl groups (i.e.,

in the polymer chain. These polyesters will typically contain a plurality of oxycarbonyl groups, also referred to as ester groups. When less than all of the available carbonyl functionality of the polyketone is reacted, the polyesters will contain both oxycarbonyl and carbonyl groups. These type of polymers are sometimes referred to as "poly(keto-esters)." For the purposes of this invention, the terms polyester polymer, peroxidation product, or polyester product, are interchangeable and refer to polymers produced from the oxidation of the ketone groups to ester groups having any amount of ester groups in the polymer chain even if the ester groups are not the predominate group in the polymer chain.

The process of this invention involves a heterogeneous, multi-phase reaction system, preferably a slurry, consisting of polyketones and peroxyacids typically suspended in water. The process can be used to convert ketone groups in polyketone polymers to ester functionalities. For example, copolymers of carbon monoxide and ethylene may be converted to polyester polymers. While it is possible to obtain quantitative conversion of the keto groups to ester functionalities it is not necessary to convert all ketones to esters to practice this invention. Substantial amounts of keto functionality may remain and be present in the resulting polyester polymer. The conversion process is effective with most polymer systems and is not limited to those systems which are primarily ethylene based. By selection of the process variables, it is possible to vary the composition of the resulting product with respect to the amount of carbonyl and oxycarbonyl groups present, and molecular weight or melt index value thus making it possible to "tailor" products to pre-determined specifications and for specific applications.

The polyketone polymers generally utilized for the preparation of the polyester polymers in accordance with this invention comprise a hydrocarbon polymer chain having a plurality of carbonyl groups distributed throughout the polymer chain, with the carbon atom of the carbonyl group being pan of the polymer chain. The carbonyl may be randomly or uniformly distributed within the polymer molecule.

The molecular weight of the polyketones can range from about 1000 to several million or more. It is possible to react extremely high molecular weight polyketones (up to 5 million) in accordance with the present invention to convert all or a portion of the carbonyl groups to ester groups. It is also possible to substantially maintain molecular weight control of the resulting polyester product and, if desired, produce a high molecular polyester product. Generally, in the preferred embodiments, the polyketones will have a molecular weight from about 1000 to about 2,000,000. More particularly, the polyketones will have a molecular weight from about 10,000 to about 1,000,000. Even more particularly, the polyketones will have a molecular weight of about 10,000 to about 500,000. Instead of molecular weight, one can consider melt index (MI) as an alternate parameter to employ. MI values of the polyketone starting material may range from about 0.1 to about 10 dg/min.

The carbonyl content (% CO) of the polyketones may range from about 0.01 mole % up to about 50 mole %. Preferably, the carbonyl content will range from about 0.5 to about 20 mole %.

The polyketones employed can be obtained by any of the methods described in the art. The method of preparation of the polyketone is irrelevant to this invention provided that the polyketone employed is substantially free of impurities such as catalyst residues, or the like. Polymer impurities may interfere with the oxidation process of the carbonyl group. While the polyketones are most advantageously prepared by the copolymerization of carbon monoxide and alpha olefins, such as ethylene or propylene, other procedures as described in the art may be employed. The alpha olefins employed typically have from 2 to about 20 carbon atoms, preferably 2 to about 12 atoms, and include aliphatic alpha olefins such as ethylene, propylene, 1-butene, isobutylene, 1-hexene, 1-octene, and alpha olefins having aromatic substitutents such as styrene, p-methyl styrene, alpha methyl styrene and the like. Polyketones obtained from the polymerization of carbon monoxide and ethylene, or the polymerization of carbon monoxide ethylene and a second alpha olefin having from 3 to about 8 carbon atoms, and particularly propylene, are preferred. Polyketones having functional groups, such as alkoxy, arytoxy, acyl, acyloxy, carboxy and derivatives thereof, pendant to the polymer backbone may also be employed. See U.S. Pat. No. 4,957,997, for a discussion on suitable polyketones employed with the process of this invention.

The process may also be employed with polymers having carbonyl groups present in the polymer chain and derived from one or more olefinically unsaturated monomer such as ethylene or other alpha olefin such as styrene, acrylonitrile, acrylamide, vinyl chloride, vinyl acetate, acrylic acid and esters thereof, maleic anhydride and mono and diesters thereof and the like, methylene dioxapenes or similar ketene acetals, and the like.

The physical characteristics of the resulting polyester polymer are a function of the molecular weight, the molecular weight distribution of the polymer and the extent of conversion of carbonyl to ester functionalities. These functions in turn depend on the reaction conditions employed, such as reaction time, pH of the reaction, amount of the peroxidizing agent, reaction temperature, and particle size of the polyketone.

In an embodiment of the invention, polyketones are convened to polyesters in a process comprising contacting at least one polyketone, at least one peroxidizing agent and a liquid carrier in a slurry oxidation reaction. The peroxidizing agent is generally an organic peroxyacid represented by the following general formula:

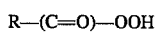

wherein R is a $C_{1-19}$ aliphatic, $C_{5-9}$ cyloaliphatic, or $C_{6-19}$ aromatic radical unsubstituted, or substituted with one or more halo, nitro, or carboxyl groups. Especially useful peroxidizing agents include chloro-, fluoro-, and carboxyl-substituted aromatic or aliphatic peroxyacids containing from 2 to about 30 carbon atoms. These peroxyacids, both in liquid and solid form, are particularly effective for the slurry process when employed at molar ratios of peroxyacid to carbonyl in the polyketone from about 0.1:1 to about 5:1. The amount of peroxyacid employed is dependent on the degree of conversion desired. For example, to convert 100% of the available ketone groups to ester groups would require a 1:1 molar ratio of peroxyacid to carbonyl group; 50% conversion would require 0.5:1 molar ratio.

In one embodiment of this invention, the peroxyacid employed can be generated in-situ, and subsequently recycled, by treating a parent carboxylic acid-or metallic salts (e.g. ammonium molybdate, vanadates, etc.) with hydrogen peroxide ($H_2O_2$) in the presence of a suitable catalyst, e.g, concentrated sulfuric acid. The resulting peroxidizing agent is employed in the oxidization of the keto group to an ester group. In order to recycle the process, one may add additional catalyst and peroxide agent to the reaction loop to re-generate the peroxyacid and continue with the oxidization of the polyketone polymer.

In an alternate embodiment, a prepared peroxyacid agent may be contacted with the polyketone and the liquid carrier. The peroxyacid may be selected from the group consisting of peroxybenzoic acid, MCPBA, PAA, trifluoroperoxyacetic acid, monoperoxyphthalic acid, monoperoxymaleic acid. urea—$H_2O_2$, and arsenic—$H_2O_2$. The most preferred peroxyacid agent is MCPBA.

The particle size of the polyketone is a factor affecting the rate of ester conversion. At similar reaction temperatures, large pellets of polyketones are converted to polyester groups at a slower rate than finely powdered polyketone polymer. Polyketone polymer particles usefully employed range from pellets, to granules, to coarse powder to finely divided powdery polymer having a particle size distribution from about 0.01 to about 10,000 microns ($1\times10^{-5}$–10 mm). Acceptable lower limit particle sizes of polyketone polymer include 0.0 1, 10, or 100 micron size; acceptable upper limit particle sizes include 1000, 5000, or 10,000 micron size particles. A preferred polyketone particle size range is from about 0.01 to about 1,000 microns (about $1\times10^{-5}$–1 mm) with a particularly preferred particle size range being from about 0.01 to about 10 microns ($1\times10^{-5}$–$1\times10^{-2}$ mm).

Examples 1, 3, 5, and 7 shown on Table 1, demonstrate the effect of particle size on ester conversion rate. The ester mole % increased from about 3.4 to about 7.2 mole % with decreasing particle size. The peroxidation rate, which is dependent upon the available particle surface area, is larger with decreasing particle size of the ketone starting material, i.e., the smaller particle size of the substrate.

Reaction temperature affects the final polyester product formed. Increasing reaction temperature results in an increase in ester conversion rate but at the expense of molecular weight of the polymer. The molecular weight of the peroxidation product decreases sharply with increasing reaction temperature. This is observed in Table 1, examples 2, 3, 6, and 7. For a given particle size, experiments having longer reaction times, e.g., 60 minutes, examples 3 and 7, resulted in higher ester mole %. Usually, but not always, higher molecular weight peroxidation products are obtained by performing the reaction at lower temperatures for shorter reaction times.

Reaction temperature is generally ambient to about 100° C. The preferred reaction temperature employed is greater than about 60° C. Preferably the reaction temperature is in a range of about 65° C. to about 90° C. Ideally, reaction temperature is in a range of about 65° C. to about 85° C. and most preferably about 65° C. to about 80° C. In choosing reaction temperature, it is important to consider the melting point of the polyketone employed, the melting point of the final polyester formed, the desired molecular weight of the polyester product, and the effect of temperature on the stability of the peroxidizing agent employed. For example, to obtain a polyester polymer having about 5 mole % ester groups, and a molecular weight of about 50,000, it is preferred to operate at a temperature of about 65° C. for a reaction time at the 65° C. temperature of about 1 hour, maintaining the reaction at a pH of about 2, and employing MCPBA as the peroxidizing agent. Since MCPBA decomposes above 95° C., a temperature range of about 65°–90° C. is suitable, with a reaction temperature of about 65° C. being preferred. The higher reaction temperatures favor the peroxidation rate. thus increased ester mole %. Table 1. examples 3, 4, 6, and 8 illustrate this feature of the inventive process. Specifically, example 3 was run at about 10° C. higher temperature than example 4 and resulted in a greater ester mole %. However, the greater temperatures also resulted in lower molecular weight product as evidenced by examples 3 and 8.

The reaction time is typically about or greater than 5 minutes at the preferred temperatures. Preferably the reaction time is in the range of about 5 minutes to about 3 hours, and most preferably in the range of about 15 minutes to about 2 hours. Again, longer reaction times result in higher ester content for the polyester polymer, but lower molecular weight polymer.

Generally, the reaction is carried out in an inert, liquid carrier which is a non-solvent for both the starting material, i.e., polyketone, and the reaction product or polyester. It is important that the solvent not react with either the polyketone or the polyester product and does not oxidize under the reaction conditions employed. Additionally, the solvent should not be capable of dissolving or swelling the polyketone starting material polymer or the peroxidation product, polyester polymer. While the boiling point of the solvent is not critical, the boiling point should not be so high as to make the solvent difficult to remove. The reaction can be run under reflux conditions or in a pressure vessel. Preferably the liquid carrier is a polar solvent. The most preferred liquid carrier is water. Exemplary alternate solvents include alcohols such as methanol or ethanol, ethers, acetonitrile, or solvents such as ethyl acetate. Generally any organic, non-solvent having a high dielectric constant and being free of keto groups is acceptable. It is preferred to employ high grade, or ACS reagent grade solvents which typically have a purity level greater than about 99%. Technical grade solvents, or those solvents having about 90% purity level, are sufficient provided that the impurities present do not interfere with the oxidation reaction of the polymer ketone group or the desired corresponding ester group. In a preferred embodiment, the water employed is deionized, however there is no particular need to treat the water provided the water is relatively free of impurities or minerals. Generally, the oxidation reaction is run with a sufficient amount of solvent to provide about a 10 to about 20 weight % slurry suspended in the solvent or carrier.

In a preferred embodiment, the pH of the reaction is greater than or equal to about 1. Generally the reaction pH is in the range of about 1 to about 7. The reaction may be performed at lower limits of pH of about 1, 2, or 3 or upper limits of about 5, 6, or 7. Preferably the pH of the reaction is maintained, usually by the dropwise addition of concentrated sulfuric acid, in the range of about 2 to about 3. Hydrolysis of the ester group typically occurs in highly acidic environments. Therefore, unless hydrolysis of the ester group is desired, low or extremely low pH values are not recommended for long periods of time. There is a linear relationship between weight % acid (e.g., MCPBA) and peroxidation rate. This is shown in Table 1, examples 9, 10, and 11, where the acid content was increased with each respective example and resulted in an increased ester mole % and MI value. It has also been found that the ester mole % and molecular weight (or MI value) of the resulting polyester product is controlled by pH of the reaction. As shown in examples 12–16, lower pH values (i.e., pH 2) favors the higher peroxidation rate with minimum degradation to the molecular weight. Comparative example 17 illustrates that at neutral pH (i.e., pH 7), and after about 60 minutes of reaction time at a temperature of about 65° C., molecular weight degradation will occur. This confirms that the slurry oxidation reaction involves an acid catalyzed rate determining step.

The reaction conditions discussed above will be selected based on the degree of ester conversion desired. As previously noted, all of the available carbonyl groups may be convened to ester groups, but this is not necessary. The manipulation of reaction times and conditions allows for control of molecular weight as well as control of undesirable side reactions.

In one embodiment of this invention, the polyketone is added to a reaction vessel charged with water under an inert atmosphere. The peroxyacid is slowly added to the reaction while maintaining stirring. After the appropriate time to allow for the desired conversion, the polyester polymer is filtered, washed successively with an alcohol solvent and dried.

In a preferred embodiment, an equimolar (about 0.02 mole of CO) mixture of the $C_2^=$/CO copolymer (powder, about 6 g), and MCPBA (Pfaltz & Bauer, Inc., about 72%, about 6g, or about 0.02 mole of acid) is suspended in water (about 60 ml), in a reaction vessel (about 250 ml, 3-necked, fitted with a mechanical stirrer, condenser/nitrogen inlet, and a stopper), heated (oil-bath, regulated by a J-type thermo couple) to about 85° to 95° C. with continuous stirring under nitrogen atmosphere and maintained at that condition for about a 1 to 3 hour period. In order to monitor the reaction, samples of the reaction mixture are withdrawn frequently (e.g., 15 min., 30 min., 1 hr, 2 hr, and 3 hr intervals) and the polyester product isolated. It is preferred to filter the polyester product while the slurry reaction is hot. Work-up procedures for the samples withdrawn include successive washes with methanol (2×50 ml), 5% sodium bisulfite/water (50 ml), water, 10% sodium bicarbonate/water (50 ml), and water. The samples are then dried under vacuum at about 50° C. overnight and are analyzed by $^1$H-NMR, FTIR, GPC, and DSC techniques. If desired and depending on end use application, additives, such as antioxidants. may be incorporated into the polyester polymer.

Another embodiment of the present invention involves a process for converting polyketones to polyesters comprising contacting at least one polyketone, at least one peroxidizing agent, and a liquid carrier in a slurry reaction, said polyketone being substantially insoluble in the carrier at the temperature wherein the polyketone, the agent, and the carrier are contacted. Substantially insoluble is intended to mean that no more than about 1 grams/liter of polyketone polymer dissolves in the liquid carrier.

In accordance with the inventive process, a polyester composition may be prepared having generally any desired mole % ester content or molecular weight (or MI value). Employing the preferred embodiment described above, a polyester composition was prepared comprising about or greater than 4 mole % ester groups and having a weight average molecular weight greater than about 10,000. A particularly useful polyester composition was prepared for application investigations comprising about 4 to about 6 mole % ester, and having a MI in the range of about 20 to about 30 dg/min.

In an alternate embodiment, instead of starting with a polyketone, one may begin the reaction with a polyolefin, and catalytically oxidize to a polyester via a polyketone intermediate. This is a two stage process involving two catalytic systems, i.e., the aerobic oxidation of polyolefin (e.g., polyethylene) to a polyketone, and the aerobic oxidation of a polyketone to a polyester. The polyolefin can be oxidized to a polyketone by molecular oxygen in the presence of an aidehyde and an acid catalyst (e.g., Fe(0), Ru(III)); the polyketone can then be oxidized, using the slurry process, to a polyester by molecular oxygen in the presence of an aidehyde and a suitable catalyst (e.g., Fe(III)).

In another alternative embodiment, a polyketone can be oxidized to a polyester in a liquid or slurry phase by contacting a polyketone with molecular oxygen or air, a metallic catalyst (e.g., nickel salt), and an aidehyde (e.g., benzaldehyde). The oxidant is either molecular oxygen or a gas containing oxygen, at about 1 atmosphere or higher pressures (e.g., about 1 to about 50 atm). Examples of the catalyst include metal salts such as nickel oleate, octoate, naphthenate, benzoate, or the like. The oxidation may be carried out in the presence of inert solvents such as chlorinated hydrocarbons such as chlorobenzene or esters such as ethyl acetate, or polar solvents such as water. The reaction may be performed by passing the oxygen gas through the reaction mixture. The reaction is preferably conducted at a temperature below 100° C., most preferably between about 25° C. to about 65° C. In a preferred embodiment of this alternate reaction, a vessel fitted with a stirrer, a feeding device, a reflux condenser, a gas outlet, and a thermometer, is charged with benzaldehye (about 1 mole), polyketone (about 2 moles CO), nickel oeloate (about 0.1 g), water (about 500 ml) and air is passed through the reaction with simultaneous stirring at about 65° C. for about 1 to about 3 hours.

The inventive slurry reaction process may be conducted as a batch or continuous polymerization. Continuous slurry polymerization is preferred in which the acid reagent may be generated in-situ and recycled, and polyketone is continuously supplied to a reactor in an amount equal to the polyester removed from the reactor.

It is known that polyketones. particularly ethylene-carbon monoxide copolymers exhibit photodegradability (due to absorption of radiation by the carbonyl group). The polyester products obtained in accordance with this invention also exhibit biodegradability. The degree of biodegradability typically increases with increasing percent conversion of main-chain carbonyl groups to ester groups. The biodegradable polyesters obtained in accordance with this invention are useful as plastics and waxes. The present polyesters also are useful as adhesives and coatings, spun-bond fibers for disposable diaper applications, and other nonwoven applications. These polyesters are also useful as compatibilizers for polymer blends containing polar and nonpolar polymers. Typical examples of polymer blends useful as compatibilizers include polyethylene/polyester, polyethylene/polyamides, and the like. These polyester products may also be used in polymer blends containing both biodegradable/nonbiodegradable components. Examples of such polymer blends include polyethylenes, EVA, EMA, ethylene/acrylate/acrylic acid terpolymer, polycaprolactones, polyhydroxyalkanoates, natural rubber. and the like. Yet another use of the polyester products prepared in accordance with the invention include these polyesters as starting materials for telechelic (sometimes referred to as bifunctional polymers or polymers having functional groups at both ends) polymers or telechelic polyethylenes containing hydroxy and carboxyl groups at the chain ends. Such telechelic polymers may be produced by the hydrolysis of the ester group under extended reaction time of the slurry per oxidation reaction. Such telechelic polyethylenes are useful as building blocks for polyurethanes, other polyesters, polyesteramides, and the like.

Prior art processes, such as described previously do not generally produce polyester polymers having molecular weights greater than about 10,000. The solution process described by Chang (U.S. Pat. Nos. '711 and '997) and the solid or molten process described by Austin (U.S. Pat. No. '797) are not generally capable of controlling the molecular weight of the peroxidation product. Theretbre, irrespective of the molecular weight of the starting polyketone, the molecular weight of the polyester product is usually significantly lower than the starting material. The slurry process described herein allows for molecular weight control by controlling reaction conditions as discussed previously. A comparative example (not identified in Table 1) employing the process as described by Austin et al., U.S. Pat. No. '797 in example 5, employing a polyketone (molecular weight 45,000, 11 mole % ester) and MCPBA in a 1:1 molar ratio, heated in a Brabender reactor over a 30 minute period at about 90° C., at 80 RPM, for the last 7 of 30 minutes of the reaction, resulted in a polyester having a molecular weight of about 10,800. The same polyketone polymer and MCPBA ratio reacted over 30 minutes at a temperature of about 80° C. using the slurry process described herein resulted in a polyester having a molecular weight of about 36,000.

The process for converting polyketones to polyesters as described by Chang et al., or Austin et al., generally does not produce polymer which can be further processed into films, fibers, or articles. This is generally due to the lack of molecular weight control. The polyesters produced by the slurry process described in this application can be manufactured into films, fibers or articles because of the ability to obtain polymers of higher molecular weights (i.e., about or greater than about 10,000).

Examples of articles of manufacture which can be produced from the polyester product include six-pack ring can holders, nonwovens, disposable diapers, wipes, and the like. It is envisaged that articles fabricated from a polyketone can be made biodegradable via the slurry process described herein. For example, a polyketone article may be converted to a polyester article without losing mechanical integrity, by merely subjecting the article to an acid-slurry process instead of having to subject the polyester polymer to the slurry process prior to forming the article.

Fibers (5 mole % ester, MI=28 dg/min) were extruded from the polyester resins produced by the present inventive process, using a Randcastle micro extruder (¼" diameter). The fibers crystallized rapidly facilitating fast pick up speed.

Films (4 mole % of ester, MI about 30 dg/min) were extruded from the polyester resins produced by the present inventive process, using a Randcastle micro extruder (¼" diameter). Stress-strain properties relative to the starting material indicated the elastomeric properties of the polyester product.

In addition to elastomeric properties, the polyester films also exhibited heat sealing and wettability characteristics. The wettability characteristic indicates an ability to print on the film. The heat sealing character indicates among other features, the ability to employ the films in packaging applications. The films were also found to be thermally stable up to about 250° C.

The polyester products obtained were also blended with low-density-polyethylene, polycaprolactone, natural rubber, ethylvinyl acetate, and polyhydroxy butyric acid respectively. The compatibility of these blends was investigated for thermal and mechanical properties.

The present invention provides a safe operation using large quantities of peroxyacid, in either solid or liquid form, a simple work-up procedure, efficient and controllable conversion rate, reaction conditions that are amenable to tailor the molecular weight of the product with minimum degradation, and use of reagents which can be generated in-situ and be recycled.

Having broadly described the present invention, and preferred embodiments thereof, it is believed that the same will become more apparent by reference to the following examples. The examples are presented solely for purposes of illustration and should not be construed as limiting the invention.

EXAMPLES

Materials

Ethylene/carbon monoxide copolymer samples, prepared by a high pressure, free radical polymerization process, were obtained from Exxon Chemical Company, Baton Rouge, La. The samples are identified as XV 44.09 which has CO content of about 11 mole %, weight average molecular weight (Mw) of about 154,000, number average molecular weight (Mn) of about 14,500, molecular weight distribution (MWD) of about 10.6, melting point (Mpt) of about 104° C., MI of about 1 dg/min. M-chloroperoxybenzoic acid was obtained from Pfaltz and Bauer Inc. and employed as received, without further processing. Deionized water was employed as the liquid carrier.

EXAMPLES 1–17

General Procedure

Table 1 illustrates reaction conditions employed for examples 1–17. The general procedure employed a mixture of the $C_2^=$/CO copolymer and MCPBA suspended in water in a reaction vessel and heated to about 65°–95° C. The reaction mixture was maintained at the specified temperature with continuous stirring for about 5 minutes to about 2 hours at which point the reaction was stopped and the polyester product filtered hot. The reactions were maintained at a pH of about 2–3 or a pH of about 7. Reactions were made acidic by the dropwise addition of concentrated sulfuric acid. The polyester product isolated was then washed successively with aqueous sodium sulfite solution, sodium-bi-carbonate solution, and methanol. The white powder reaction product is dried at about 50°–55° C. under vacuum and characterized using FTIR, $^1$H-NMR, GPC and DSC techniques.

TABLE 1

Peroxidation Of $C_2^=$/Co Copolymer (XV 44.09): Kinetic Data

| | Reaction Conditions | | | | | Product Characterization | | | | |
|---|---|---|---|---|---|---|---|---|---|---|
| Example # | $C_2^=$/CO (g) | MCPBA (g) | Water (ml) | Temp (°C.) | Time (min) | Ester Mole % ($^1$H-NMR) | Mw (GPC) | Mn (GPC) | MWD (GPC) | Mpt (DSC, °C.) | MI (dg/min) |
| | Pellets | | | | | | | | | | |
| 1. | 6 | 6 | 60 | 85 | 60 | 3.4 | 39726 | 5914 | 6.72 | 99.5 | |
| | Coarse Powder | | | | | | | | | | |
| 2. | 6 | 6 | 60 | 85 | 30 | 3.6 | 41007 | 6959 | 7.33 | n/a | |
| 3. | 6 | 6 | 60 | 85 | 60 | 5.4 | 46057 | 6828 | 6.75 | 97.9 | |
| 4. | 6 | 6 | 60 | 75 | 60 | 3.4 | 87244 | 9382 | 9.23 | 98.2 | |
| | Granules | | | | | | | | | | |
| 5. | 30 | 30 | 300 | 85 | 60 | 4.8 | 28104 | 4727 | 5.95 | 98.2 | |
| | Fine Powder | | | | | | | | | | |
| 6. | 6 | 6 | 60 | 85 | 30 | 5.1 | 76366 | 27320 | 2.80 | 97.0 | |
| 7. | 6 | 6 | 60 | 85 | 60 | 7.2 | 26697 | 14205 | 1.88 | 96.4 | |
| 8. | 6 | 6 | 60 | 90 | 30 | 7.6 | 17722 | 4809 | 3.69 | 97.6 | |
| 9. | 50 | 30$^a$ | 600 | 85 | 8 | 3.5 | 20385 | 3888 | 5.2 | 98.0 | 124 |
| 10. | 50 | 40$^a$ | 800 | 85 | 8 | 4.3 | 27138 | 6462 | 4.2 | 97.9 | 212 |
| 11. | 50 | 50$^a$ | 800 | 85 | 8 | 5.6 | 16372 | 4818 | 3.4 | 95.7 | 637 |
| 12. | 50 | 40$^b$ | 500 | 65 | 0 | 1.5 | 169792 | 13182 | 12.9 | 100.8 | n/a |
| 13. | 50 | 40$^b$ | 500 | 65 | 15 | 2.4 | 141998 | 14404 | 9.9 | 99.3 | n/a |
| 14. | 50 | 40$^b$ | 500 | 65 | 30 | 3.7 | 117450 | 13149 | 8.9 | 98.7 | n/a |
| 15. | 50 | 40$^b$ | 500 | 65 | 45 | 4.2 | 108813 | 13482 | 8.1 | 98.1 | n/a |
| 16. | 50 | 40$^b$ | 500 | 65 | 60 | 4.7 | 98903 | 13499 | 7.3 | 98.1 | 16 |
| 17. | 50 | 40$^a$ | 500 | 65 | 60 | 4.0 | 28885 | 6557 | 4.4 | 99.0 | 237 |

Mw = weight average molecular weight; Mn = number average molecular weight; MWD = molecular weight distribution; MI = melt index; Mpt = melting point.
$^a$pH = 7; $^b$pH = 2. The reaction time noted is for that at the specified temperature.

While an embodiment and application of this invention has been shown and described, it will be apparent to those of skill in the art that many more modifications are possible without departing from the inventive concepts herein described. The invention is therefore not restricted except as is necessary by the art and the claims.

I claim:

1. A method to produce an article of manufacture comprising the steps of:

(a) contacting at least one polyketone, at least one peroxidizing agent, and a liquid carrier in a slurry oxidation reaction to produce a polyester product; and (b) forming said article from the polyester product of step (a).

2. A method in accordance with claim 1 wherein said article is a film.

3. A method in accordance with claim 1 wherein said article is a fiber.

* * * * *